United States Patent
McDonald et al.

(10) Patent No.: US 10,476,780 B2
(45) Date of Patent: Nov. 12, 2019

(54) ROUTING PACKETS BASED ON CONGESTION OF MINIMAL AND NON-MINIMAL ROUTES

(71) Applicant: Hewlett Packard Enterprise Development LP, Houston, TX (US)

(72) Inventors: Nicholas George McDonald, Ft. Collins, CO (US); Michael Isaev, Ft. Collins, CO (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 109 days.

(21) Appl. No.: 15/719,928

(22) Filed: Sep. 29, 2017

(65) Prior Publication Data

US 2019/0104054 A1    Apr. 4, 2019

(51) Int. Cl.
*H04L 12/707*    (2013.01)
*H04L 12/733*    (2013.01)
*H04L 12/801*    (2013.01)

(52) U.S. Cl.
CPC ............ *H04L 45/122* (2013.01); *H04L 45/24* (2013.01); *H04L 47/12* (2013.01)

(58) Field of Classification Search
CPC ..... H04L 45/02; H04L 45/121; H04L 45/122; H04L 45/125; H04L 49/3009
See application file for complete search history.

(56) References Cited

U.S. PATENT DOCUMENTS

| | | | |
|---|---|---|---|
| 7,362,703 B1* | 4/2008 | Taft | H04L 45/06 370/230 |
| 7,492,722 B2 | 2/2009 | Pietraski et al. | |
| 9,137,143 B2 | 9/2015 | Parker et al. | |
| 9,577,918 B2 | 2/2017 | Bataineh et al. | |
| 2016/0294694 A1 | 10/2016 | Parker et al. | |
| 2017/0222914 A1* | 8/2017 | Fedyk | H04L 45/125 |
| 2018/0006945 A1 | 1/2018 | Flajslik et al. | |
| 2018/0006946 A1 | 1/2018 | Flajslik et al. | |

OTHER PUBLICATIONS

Faizian, P. et al.; "Traffic Pattern-based Adaptive Routing for Intra-group Communication in Dragonfly Networks"; Aug. 24-26, 2016; 8 pages.

(Continued)

*Primary Examiner* — Asad M Nawaz
*Assistant Examiner* — Zhaohui Yang
(74) *Attorney, Agent, or Firm* — Hewlett Packard Enterprise Patent Department

(57) ABSTRACT

Examples relate to routing packets based on the actual congestion sensed in the minimal and the non-minimal candidate routes between a source network device and a destination network device. A packet is received at a network device in a network and all possible minimal and non-minimal candidate routes for the packet to be routed to the destination network device are determined. An adaptive weight is assigned to the non-minimal candidate routes, wherein the adaptive weight is a function of congestion of the minimal candidate routes and the non-minimal candidate routes. An optimal route is selected among the plurality of candidate routes and the packet is routed to the destination device using the optimal route.

16 Claims, 5 Drawing Sheets

(56) References Cited

OTHER PUBLICATIONS

Mubarak, m. et al.; "Modeling a Million-node Dragonfly Network Using Massively Parallel Discrete-event Simulation"; Nov. 10-16, 2012; 11 pages.
Touati, H. et al.; "A Weighted Minimal Fully Adaptive Congestion Aware Routing Algorithm for Network on Chip"; Feb. 8, 2018; 5 pages.

* cited by examiner

ROUTING PACKETS BASED ON CONGESTION OF MINIMAL AND NON-MINIMAL ROUTES

BACKGROUND

Routing algorithms may make use of weighted decisions based on congestion and hop count (e.g., Universal Globally Adaptive Load-Balancing (UGAL) routing algorithms) to route data packets through nodes in a network. These routing algorithms may estimate the expected remaining delay in routing the data packets by multiplying the hop count and congestion of the network and choose the route that yields the lowest weight, which approximates the lowest delay between the source node and the destination node.

Adaptive routing algorithms may select between minimal and non-minimal routing according to current network load. Adaptive routing algorithms may select minimal routes when the traffic in the network needs no load balancing or is already load balanced. Adaptive routing algorithms may select non-minimal routes when the traffic needs additional load balancing to reach the theoretical throughput provided by the network topology. Therefore, weighted decision routing algorithms compare network state representing minimal and non-minimal routes. Some weighted decision routing algorithms may add a bias value as part of the weight to non-minimal routes to artificially make them more or less desirable for routing packets. Adding a fixed value biasing may increase the performance of load balanced traffic and degrade the performance of non-load balanced traffic. A different value may have the opposite effect of degrading the performance of load balanced traffic and increasing the performance of non-load balanced traffic.

DETAILED DESCRIPTION

Figure 1:
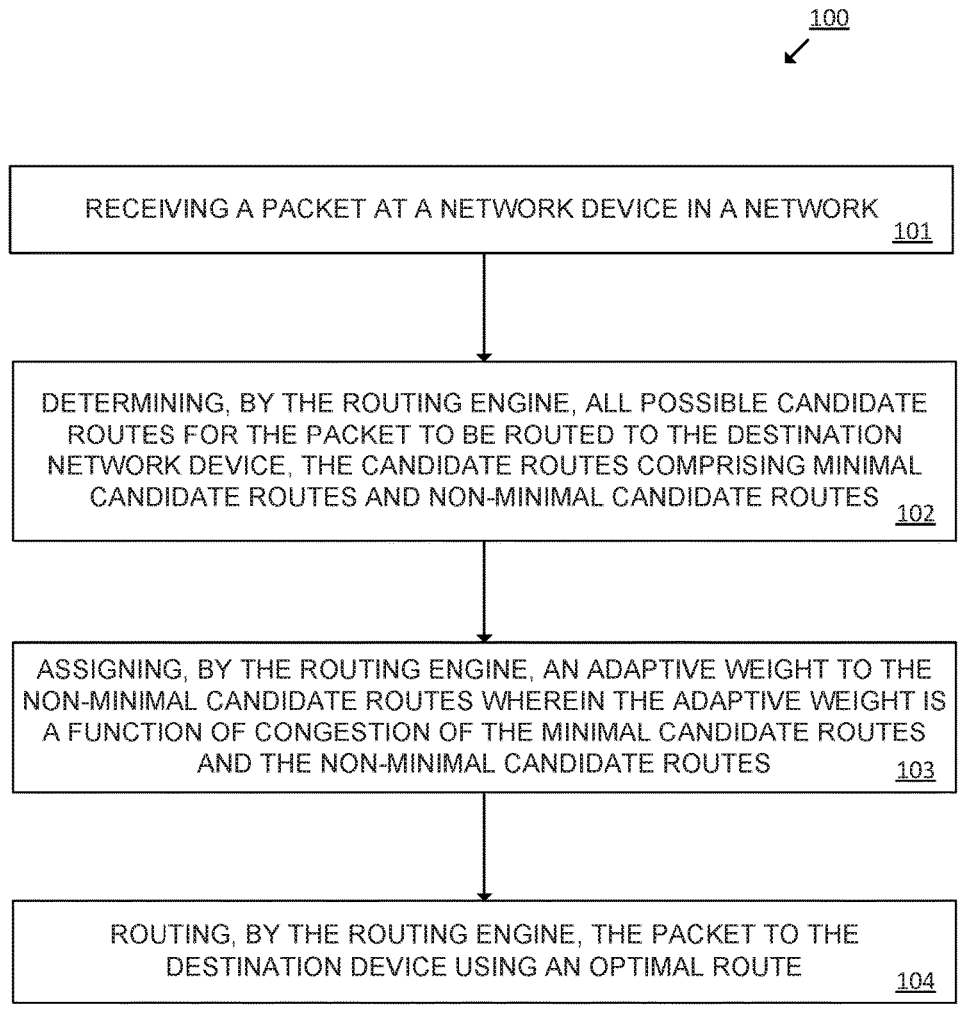
FIG. 1 is a flowchart of an example method for routing packets based on the actual congestion in the minimal and the non-minimal candidate routes between the source network device and the destination network device.

Examples disclosed herein describe methods for routing packets based on the actual congestion sensed in the minimal and the non-minimal candidate routes between the source network device and the destination network device. These methods may comprise receiving a packet at a source network device of a plurality of network devices in a network, wherein the packet is to be routed from said source network device to a destination network device. The plurality of network devices of the network may be, for example, routers or switches. Then, a routing engine of the source network device may determine all possible candidate routes for the packet to be routed from the source network device to the destination network device, these candidate routes comprising all possible minimal candidate routes and all possible non-minimal candidate routes between the source network device and the destination network device. As generally described herein, a routing engine may represent a combination of hardware and software logic in a network device for determining all candidate routes for a packet to take from a source device to a destination device. As used herein, "source network device" may refer to the network device receiving the packet at a specific moment, which may correspond to the first network device in the network to which the packet arrives or from which is generated or to any intermediate network device in which the packet is received in its path towards its destination network device. Thus, the method herein described may be considered an adaptive routing method.

The routing engine may further assign an adaptive weight to each one of these non-minimal candidate routes, wherein the adaptive weight adapts to and is a function of both the actual congestion in the minimal candidate routes and the actual congestion in the non-minimal candidate routes. Thus, the routing engine may continuously sense the congestion of minimal and non-minimal routes and adaptively route packets based on a combination of the sensed congestions. It may detect and adapt to both load balanced and non-load balanced traffic patterns in networks. This may also increase network stability, ease the process of tuning network settings, and increase the performance of the network.

In examples in which there is a plurality of possible minimal candidate routes between the source network device and the destination network device, the routing engine may determine the current congestion of the minimal candidate routes by selecting a congestion from a group comprising: a minimum congestion among the sensed congestions of the minimal candidate routes, a maximum congestion among the sensed congestions of the minimal candidate routes, an average of the sensed congestions in the minimal candidate routes and a random congestion among the sensed congestions of the minimal candidate routes. In examples in which there is one single non-minimal candidate route, the routing engine may determine the current congestion of the non-minimal candidate routes as the congestion in the one single non-minimal candidate route. In examples in which there is a plurality of non-minimal candidate routes, the routing engine may determine the current congestion of the non-minimal candidate routes by selecting a congestion from a group comprising: a congestion in the particular non-minimal route for which the function of congestions is being calculated, a minimum congestion among the sensed congestions of the non-minimal candidate routes, a maximum congestion among the sensed congestions of the non-minimal candidate routes, an average of the sensed congestions in the non-minimal candidate routes and a random congestion among the sensed congestions in the non-minimal candidate routes. In some other examples, the routing engine may use other criteria to determine the current congestion in the minimal and non-minimal candidate routes.

Then, the routing engine may route the packet to the destination device using an optimal route among all the candidate routes. For example, the routing engine may select the optimal route as the candidate route having a lowest estimated latency. Thus, the routing engine may route the packet using the candidate route that introduces the lowest delay in the transmission by considering the previously assigned adaptive weight in the non-minimal routes. It may help balancing traffic in all traffic patterns by routing packets through minimal routes when the current network load is balanced and routing packets through non-minimal routes when the current network load requires balancing.

As generally described herein, the congestion in a route of the network may refer to the delay sending a packet from a source network device to a destination network device due to existing data traffic in the route followed by the packet. For example, the congestion may comprise the queue occupancy of the output or egress ports of the network devices of the network, for example a network device such as a router or a switch, through which packets are going to be forwarded to the destination network device and the channel latency.

In some examples, the routing engine may determine the adaptive weight to be assigned to a particular non-minimal candidate route based on a combination of the function of the congestion of the minimal candidate routes and the non-minimal candidate routes and a number of hops of the particular non-minimal candidate route. For example, the adaptive weight of the particular non-minimal candidate route may be calculated by multiplying the output of the function of the congestion of the minimal candidate routes and the non-minimal candidate routes and the number of hops of the particular non-minimal candidate route.

As generally used herein, the number of hops (hop count) may refer to the number of intermediate network devices through which a data packet is to pass between the source or current network device and destination network device in the network. Each network device along a route between the source network device and the destination network device may constitute a hop, as the data is moved from one network device to another. Hop count may be therefore a measurement of a logical distance in a network.

In some other examples, the routing engine may calculate the function of the congestion of the minimal candidate routes and the non-minimal candidate routes by adding a product of a scalar and a difference between the congestion of a fully congested minimal candidate route and a current congestion of the candidate minimal routes to the congestion of the non-minimal routes.

In some other examples, the routing engine may calculate the function of congestion of the minimal candidate routes and the non-minimal candidate routes by calculating the difference between the congestion of the non-minimal candidate routes and the congestion of the minimal candidate routes.

In some other examples, the routing engine may calculate the function of congestion of the minimal candidate routes and the non-minimal candidate routes as the ratio between the congestion of the non-minimal candidate routes and the congestion of the minimal candidate routes.

In some other examples, the function of congestion of the minimal candidate routes and the non-minimal candidate routes may be a heuristic function that comprises determining a congestion threshold and determining whether the actual congestion of the minimal candidate routes is less than the congestion threshold. Then, the function may return infinity when the congestion of the minimal candidate route is below the congestion threshold or may return the congestion of the non-minimal candidate routes when the congestion of the minimal candidate route is higher or equal than the congestion threshold.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Turning now to the figures, FIG. 1 shows a flowchart of an example method 100 for routing packets based on the congestion in the minimal and the non-minimal candidate routes between the source network device and the destination network device. Implementation of this method 100 is not limited to such example.

At step 101 of the method 100, a particular packet of data is received at a particular network device, for example a network device such as a switch or router, in a particular network. This particular packet is to be routed to a destination network device. The destination network device may be another network device from the same particular network, an edge device of another network to which the particular network is connected or any other device external to the particular network.

At step 102 of the method 100, a routing engine of the particular network device determines all possible candidate routes for the packet to be routed from the source network device to the destination network device. These candidate routes are any possible route connecting the source network device with the destination network device and comprise all possible minimal candidate routes (routes having a minimum number of hops) and all possible non-minimal candidate routes (routes having a non-minimum number of hops) between the source network device and the destination network device. In some other examples, the routing engine may determine a subset of candidate routes among all the possible candidate routes between the source network device and the destination network device. As generally described herein, a routing engine may represent a combination of hardware and software logic in a network device for determining all candidate routes for a packet to take from a source device to a destination device.

At step 103 of the method 100, the routing engine further assigns a weight to each one of the non-minimal candidate routes previously identified. The weight assigned to each of the non-minimal candidate routes is an adaptive weight and a function of the actual congestion sensed in the minimal candidate routes and the actual congestion sensed in the non-minimal candidate routes. The adaptive weight assigned to the non-minimal candidate routes depends on the combination of the sensed congestion at the particular moment in which the packet is to be routed. It encourages non-minimal routing when traffic needs load-balancing and discourages non-minimal routing (encouraging minimal routing) when the traffic is already load-balanced. The congestion in the minimal and non-minimal candidate routes can be measured in different ways, such as measuring the output queue buffer occupancy, measuring the utilization of the output channel towards the destination network device, measuring the available credits, etc. The adaptive weight for each of the non-minimal candidate routes can be calculated by combining the actual congestion in the minimal candidate routes and the actual congestion in the non-minimal candidate routes in different ways. In some other examples the routing engine may also assign an adaptive weight to each minimal candidate route as a function of the congestion in the respective minimal candidate route and the hop count of the minimal candidate route.

At step 104 of the method 100, the routing engine routes the packet to the destination device using an optimal route among all the candidate routes. For example, the routing engine may select the optimal route as the candidate route having a lowest estimated latency. The candidate route having the lowest estimated latency is the route that may avoid undesirable high latency transmissions through the network. However, other optimal route selection criteria may be used for routing the packet to its destination. For example, the optimal route may be the candidate route that provides a best load balancing, or any other criteria that selects the best route for the packet alone. Other examples of optimal routes may be routes having a lowest estimated scheduling conflict, routes having a lowest estimated resource usage, routes having a lowest estimated drop probability, etc.

Method steps 101-104 can be executed in each of the network devices through which a packet is routed from a first source network device until the destination network device. Thus, the method 100 described herein discloses an adaptive routing algorithm that adapts to any change in the network topology.

Figure 2:
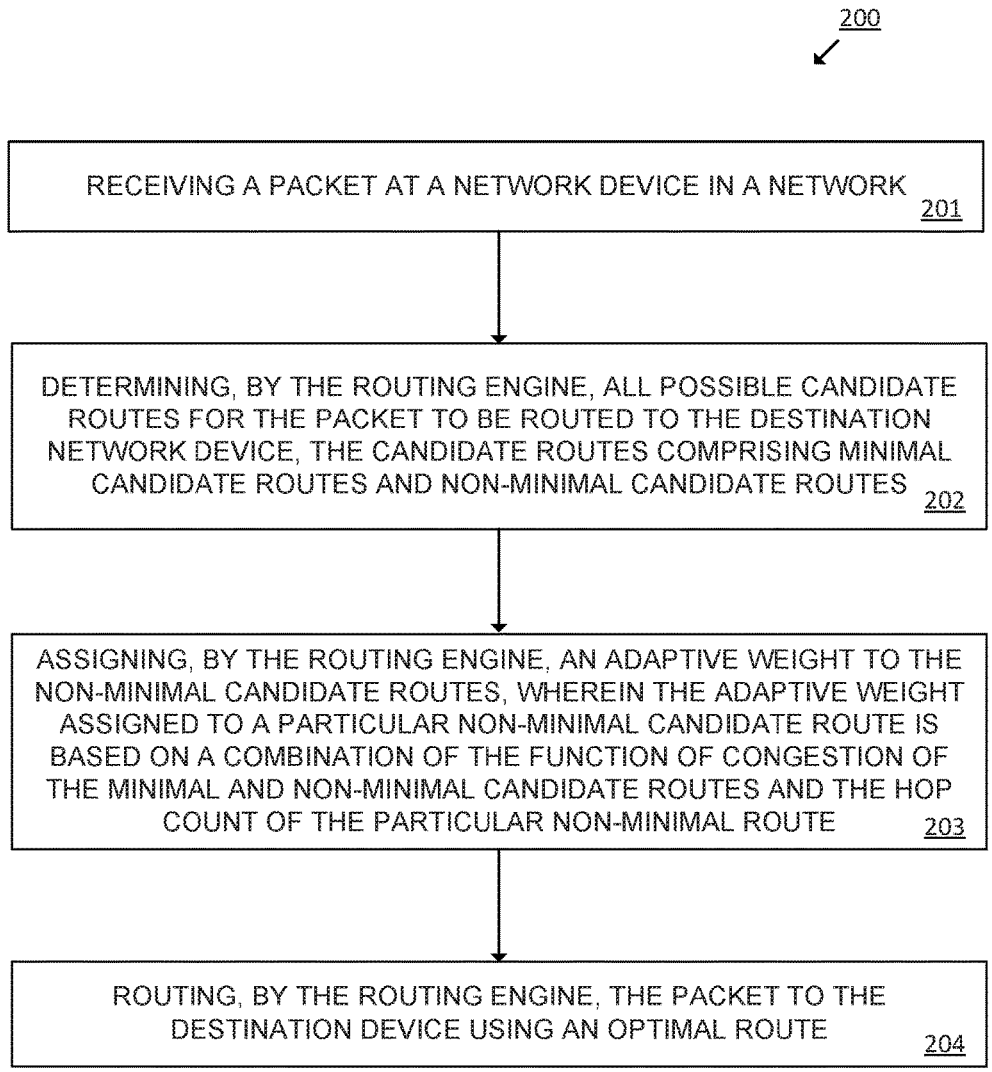
FIG. 2 is a flowchart of another example method for routing packets based on the congestion in the minimal and the non-minimal candidate routes and the hop count of the non-minimal candidate routes.

FIG. 2 shows a flowchart of another example method 200 for routing packets based on the congestion in the minimal and the non-minimal candidate routes and the hop count of the non-minimal candidate routes. Implementation of this method 200 is not limited to such example.

At step 201 of the method 200, a particular packet of data is received in a particular network device, for example a network device such as a switch or router, in a particular network. This packet is to be routed to a destination network device.

At step 202 of the method 200, a routing engine of the particular network device determines all possible candidate routes, including all possible minimal candidate routes and all possible non-minimal candidate routes, for the packet to be routed from the source network device to the destination network device.

At step 203 of the method 200, the routing engine assigns a weight to each one of the non-minimal candidate routes previously identified. The weight assigned to each of the non-minimal candidate routes is a function of the actual congestion sensed in the minimal candidate routes and the actual congestion sensed in the non-minimal candidate routes and the hop count in the respective non-minimal candidate routes. The weight can be calculated by different combinations of the actual congestion in the minimal candidate routes and the actual congestion in the non-minimal candidate routes.

In some examples, the function of the actual congestion in the minimal candidate routes and the actual congestion in the non-minimal candidate routes can be calculated as follows:

$$\text{congestionFunc}(\text{congestion}_{min}, \text{congestion}_{nonmin}) = \text{congestion}_{nonmin} + \text{scalar}*(100\% - \text{congestion}_{min}) \quad \text{(Eq. 1)}$$

wherein "congestionFunc(congestion$_{min}$,congestion$_{nonmin}$)" is a function of the congestions sensed in the minimal and non-minimal candidate routes, "congestion$_{min}$" is the actual congestion sensed in the minimal candidate routes, "congestion$_{nonmin}$" is the actual congestion sensed in the non-minimal candidate routes and "scalar" is a fixed or programmable value adaptivity (parameter that is changed to tune the weight). "100%-congestion$_{min}$" represents the difference between the minimal candidate routes fully congested (100% congested) and the actual congestion in the minimal candidate routes. "scalar*(100%-congestion$_{min}$)" represents the strength and is the term responsible of adapting routing. This function is particularly useful because it changes the detected non-minimal congestion based on a bimodal comparison between the minimal candidate routes and non-minimal candidate routes. Then, the function weights down the non-minimal candidate routes when the minimal candidate routes is uncongested thus making the non-minimal candidate routes have an undesired heavy weight and lightens the non-minimal candidate routes when the minimal candidate routes are congested thus making the non-minimal candidate routes have a light desirable weight.

Based on this function of the congestion sensed, when "congestion$_{min}$" is large, strength is small and therefore the packet can be forwarded through the non-minimal routes (non-load balanced traffic pattern). When "congestion$_{min}$" is small, strength is high and therefore the packet can be forwarded through the minimal candidate routes (load balanced traffic pattern). When "congestion$_{min}$"~="congestion$_{nonmin}$" (traffic is load balanced) and "congestion$_{min}$"~=0 (network is not congested), then strength is large (scalar*100%) and therefore the minimal route is attractive for routing the packet (load balanced traffic pattern). When "congestion$_{min}$"~="congestion$_{nonmin}$" (traffic is load balanced) and "congestion$_{min}$"~=100% (network is congested), then strength is small (~=0) and therefore the minimal route (less hops to destination) is attractive for routing the packet (load balanced traffic pattern). When "congestion$_{min}$"≠"congestion$_{nonmin}$" (traffic is not load balanced) and "congestion$_{min}$"~=100% (minimal route is congested) and "congestion$_{nonmin}$" ~=0, the strength is small (~=0) and therefore the non-minimal route is attractive for routing the packet (non-load balanced traffic pattern). This function adapts to different traffic patterns, including load-balanced and non-load balanced traffic patterns.

In some other examples, the function of the actual congestion in the minimal candidate routes and the actual congestion in the non-minimal candidate routes can be a heuristic function that comprises determining a congestion threshold and determining whether the actual congestion of the minimal candidate routes is less than the congestion threshold. Then, the function may return infinity when the congestion of the minimal candidate route is below the congestion threshold or may return the congestion of the non-minimal candidate routes when the congestion of the minimal candidate route is higher or equal than the congestion threshold. This function uses a threshold comparing to the minimal candidate route. Then, if the minimal candidate route has a congestion low enough, the packet will take the minimal candidate route regardless of the actual congestion on the non-minimal candidate route (it returns infinite). Otherwise, the congestion of the non-minimal candidate route is returned and the regular weighting is active.

In some other examples, the function of the actual congestion in the minimal candidate routes and the actual congestion in the non-minimal candidate routes can be calculated as follows:

$$\text{congestionFunc}(\text{congestion}_{min}, \text{congestion}_{nonmin}) = \text{congestion}_{nonmin} - \text{congestion}_{min} \quad \text{(Eq. 2)}$$

Therefore, the function in Eq. 2 is the difference between the congestions detected for the minimal and non-minimal candidate routes.

In some other examples, the function of the actual congestion in the minimal candidate routes and the actual congestion in the non-minimal candidate routes can be calculated as follows:

$$congestionFunc(congestion_{min}, congestion_{nonmin}) = \frac{congestion_{nonmin}}{congestion_{min}} \quad \text{(Eq. 3)}$$

Therefore, the function uses a proportional value comparing the congestions detected for the minimal and non-minimal candidate routes.

In some examples, the "$congestion_{min}$" is selected by the routing engine from a group comprising: a minimum congestion among the sensed congestions of the minimal candidate routes, a maximum congestion among the sensed congestions of the minimal candidate routes, an average of the sensed congestions in the minimal candidate routes and a random congestion among the sensed congestions of the minimal candidate routes. In some examples, the "$congestion_{nonmin}$" is selected by the routing engine from a group comprising: a minimum congestion among the sensed congestions of the non-minimal candidate routes, a maximum congestion among the sensed congestions of the non-minimal candidate routes, an average of the sensed congestions in the non-minimal candidate routes and a random congestion among the sensed congestions in the non-minimal candidate routes. In some other examples, the routing engine may use other criteria to determine the current congestion in the minimal and non-minimal candidate routes.

At step 204 of the method 200, the routing engine routes the packet to the destination device using an optimal route among all the candidate routes. For example, the routing engine may select the optimal route as the candidate route having a lowest estimated latency. In those cases the weight assigned to a particular non-minimal candidate route is to be based on a combination of the function of the congestion of the minimal candidate routes and the non-minimal candidate routes and a number of hops of the particular non-minimal candidate route. Then, the weight of the particular non-minimal candidate route is:

$$weight_{nonmin} = congestionFunc(congestion_{min}, congestion_{nonmin}) * hopcount_{nonmin} \quad \text{(Eq. 4)}$$

wherein, "$weight_{nonmin}$" is the weight assigned to a particular non-minimal route, and "$hopcount_{nonmin}$" is the number of hops of the particular non-minimal candidate route. Thus, this weight is calculated for each one of the possible non-minimal candidate routes for the packet to be routed to its destination.

Figure 3:
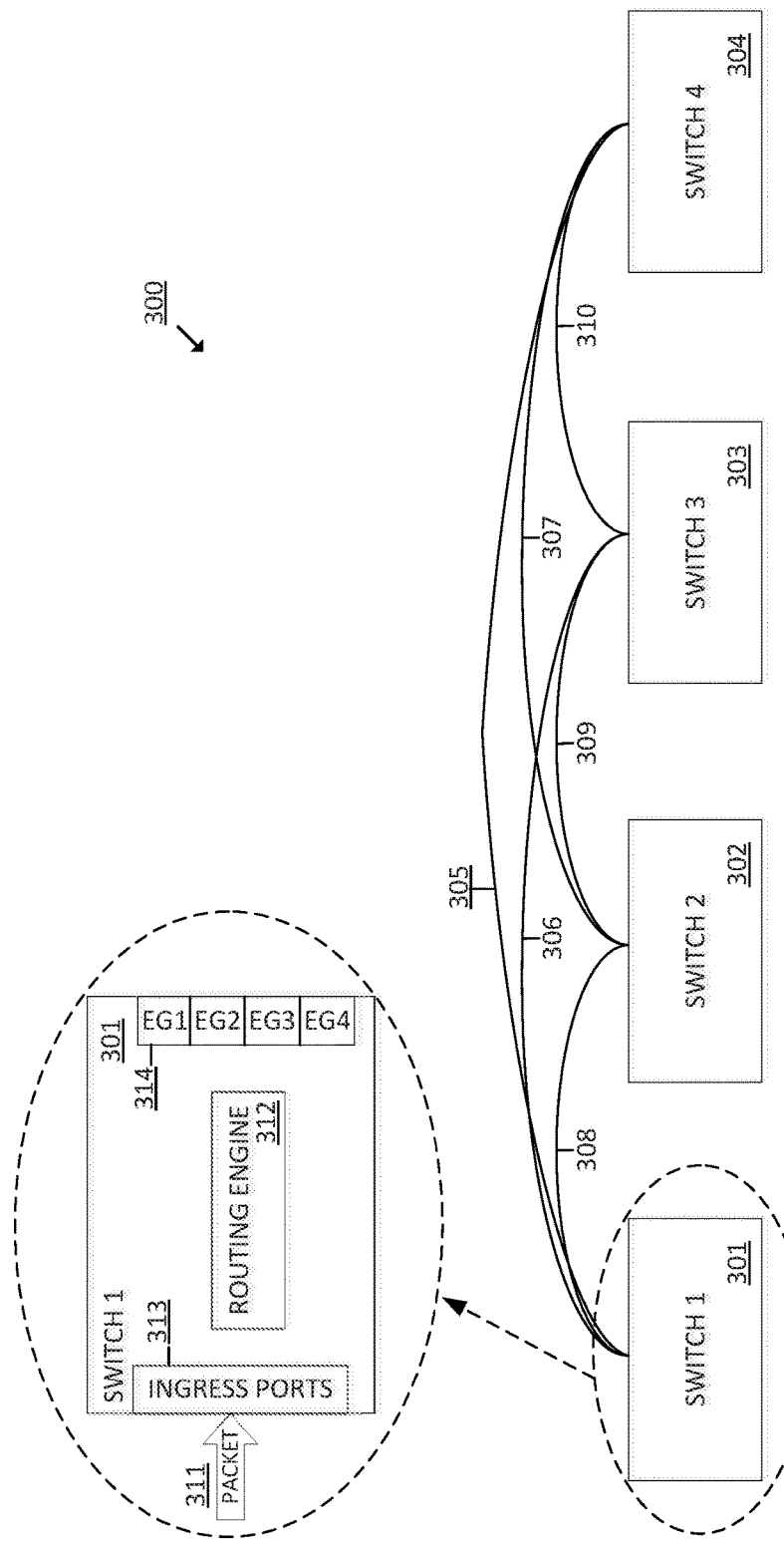
FIG. 3 is a block diagram of an example network with a plurality of network devices wherein packets are routed based on the congestion in the minimal and the non-minimal candidate routes and including a detailed view of one of the network devices of the network.

FIG. 3 is a block diagram of an example network 300 with a plurality of network devices wherein packets are routed based on the congestion in the minimal and the non-minimal candidate routes and including a detailed view of one of the network devices of the network. It should be understood that the network 300 depicted in FIG. 3 may include additional components and that some of the components described herein may be removed and/or modified without departing from a scope of the example network 300. Additionally, implementation of network 300 is not limited to such example.

The network 300 comprises four switches 301-304 connected to each other. In such example, switch1 301 is the source switch and switch4 304 is the destination switch for the packet 311 received at switch1 301 via one of its ingress ports 313. Once the packet 311 is received at switch1 301, the routing engine 312 of the switch1 301 determines all the possible candidate routes for the packet 311 to be forwarded to switch4 304. In such example, the routing engine 312 identifies one single minimal candidate route 305 and two non-minimal candidate routes: non-minimal candidate route1 306, 310 and non-minimal candidate route2 308, 307. In such example, switch1 only sees the congestion of corresponding output channels 305, 306, and 308 and senses hop 305 has a congestion of 65%, hop 306 has a congestion of 10%, and hop 308 has a congestion of 50%.

The routing engine 312 calculates a weight for each one of the minimal candidate routes, however, in this case there is only one candidate minimal route. In particular, the routing engine 312 calculates the weight for route 305 as:

$$weight_{305} = congestion_{305} * hopcount_{305} = 65\% * 1 = 0.65 \quad \text{(Eq. 5)}$$

For calculating the adaptive congestion for the weights of the candidate non-minimal routes, the routing engine 312 uses the following function:

$$func(congestion_{min}, congestion_{nonmin}) = congestion_{nonmin} + 0.5*(100\% - congestion_{min}) \quad \text{(Eq. 6)}$$

The routing engine 312 calculates a weight for each one of the non-minimal candidate routes as follows:

$$weight_{306,310} = func(congestion_{305}, congestion_{306}) * hopcount_{306,310} = (10\% + 0.5*(100\% - 65\%)) * 2 = 0.55 \quad \text{(Eq. 7)}$$

$$weight_{308,307} = func(congestion_{305}, congestion_{308}) * hopcount_{308,307} = (50\% + 0.5*(100\% - 65\%)) * 2 = 1.35 \quad \text{(Eq. 8)}$$

Then, the routing engine 312 has three route candidates and three corresponding weights, each estimating the latency to the destination following the corresponding route. In this example the routing engine 312 chooses route 306, 310 because it yields the lowest weight. The routing engine 312 may use egress port EG1 314 to route the packet to switch3 303 in its path to switch4 304.

While the network 300 shown in FIG. 3 comprises 4 switches, the network 300 may comprise any other topology and any number of switches or routers connected to each other. Besides, while FIG. 3 only shows a detailed view of switch1 301, switches 302-304 at least comprise the same elements shown in reference to switch1 301. Switches 301-304 may include additional components such as routing tables, memories, controllers and other computing resources.

Figure 4:
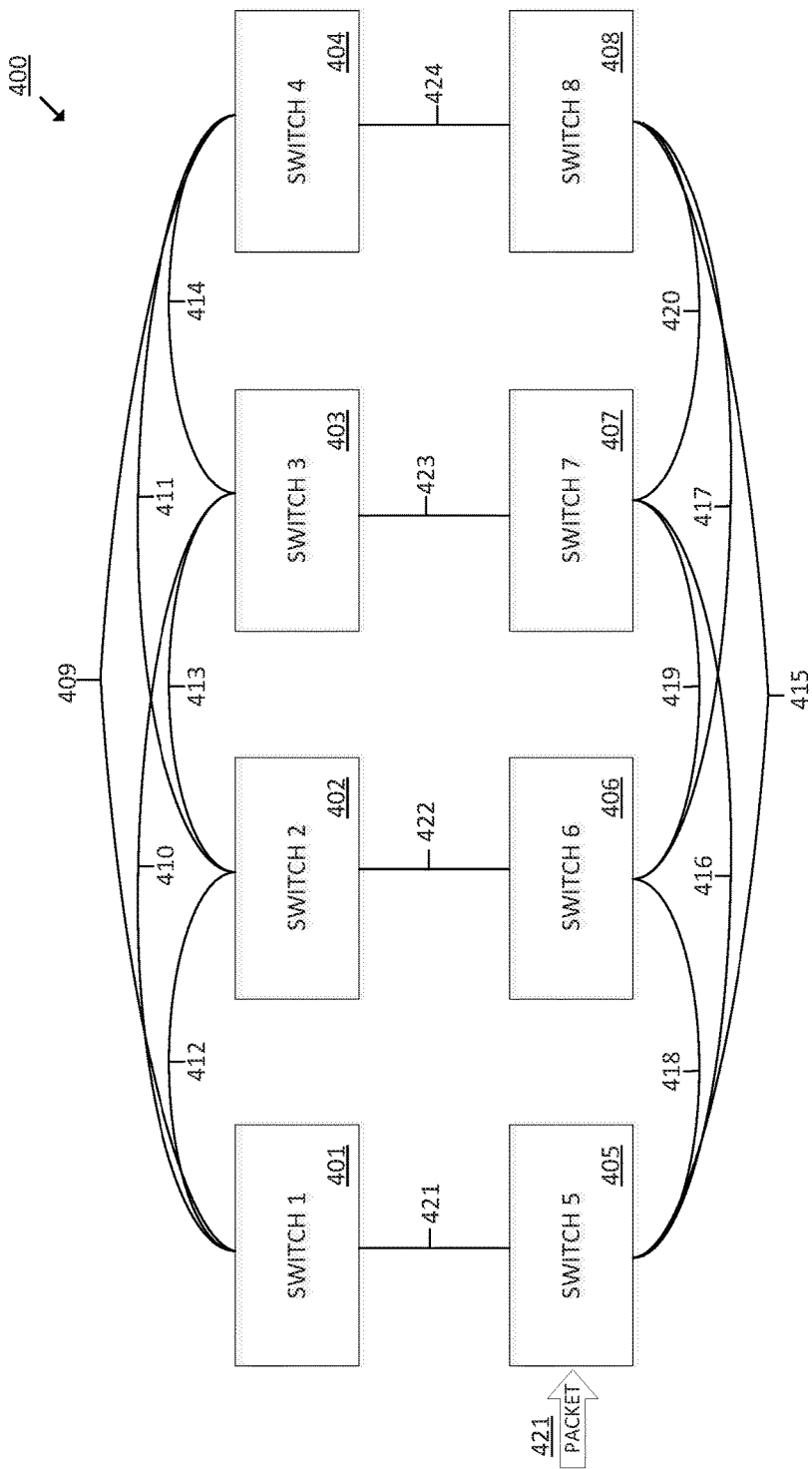
FIG. 4 is a block diagram of an example four-by-two (4:2) network wherein packets are routed based on the congestion in the minimal and the non-minimal candidate routes.

FIG. 4 is a block diagram of an example four-by-two (4:2) network 400 wherein packets are routed based on the congestion in the minimal and the non-minimal candidate routes. It should be understood that the network 400 depicted in FIG. 4 may include additional components and that some of the components described herein may be removed and/or modified without departing from a scope of the example network 400. Additionally, implementation of network 400 is not limited to such example.

The network 400 comprises eight switches 401-408 connected to each other. In such example switch5 405 is the source switch and switch4 404 is the destination switch for a packet 421 received at switch5 405. Once the packet 421 is received at switch5 405, the routing engine (not shown in this figure) of the switch5 405 determines all the possible candidate routes for the packet 421 to be forwarded to switch4 404. In such example, the routing engine identifies two minimal candidate routes: minimal candidate route1 421, 409 and minimal candidate route2 415, 424 and 2 non-minimal candidate routes: non-minimal candidate route1 418, 417, 424 and non-minimal candidate route2 416, 420, 424. In such example, switch5 405 only sees the congestion of corresponding output channels 421, 418, 416 and 415 and senses hop 421 has a congestion of 40%, hop 418 has a congestion of 25%, hop 416 has a congestion of 60% and hop 415 has a congestion of 55%.

The routing engine calculates a weight for each one of the minimal candidate routes. In particular, the routing engine calculates the weight for minimal candidate route1 421,409 and minimal candidate route2 415,424 as:

$$\text{weight}_{421,409} = \text{congestion}_{421} * \text{hopcount}_{421,409} = 40\% * 2 = 0.8 \quad \text{(Eq. 8)}$$

$$\text{weight}_{415,424} = \text{congestion}_{415} * \text{hopcount}_{415,424} = 50\% * 2 = 1.0 \quad \text{(Eq. 9)}$$

For calculating the adaptive congestion for the weights of the candidate non-minimal routes, the routing engine uses the heuristic function that comprises determining a congestion threshold and determining whether the actual congestion of the minimal candidate routes is less than the congestion threshold. In such example, the congestion threshold is 50%. Because minimal candidate route1 421,409 has a congestion value of 40% which is less than the threshold of 50%, the heuristic function returns infinity for the congestion of all non-minimal candidate routes. Note that minimal candidate route2 415, 424 has a congestion value of 55% which is above the threshold of 50%, however the heuristic function is looking for only a single minimal route below the threshold.

Then, the routing engine calculates a weight for each one of the non-minimal candidate routes as follows:

$$\text{weight}_{418,417,424} = \infty * \text{hopcount}_{418,417,424} = \infty * 3 = \infty \quad \text{(Eq. 10)}$$

$$\text{Weight}_{416,420,424} = \infty * \text{hopcount}_{416,420,424} = \infty * 3 = \infty \quad \text{(Eq. 11)}$$

Then, the routing engine has four candidate routes and four corresponding weights, each estimating the latency to the destination following the corresponding route. In this example the routing engine of the switch5 405 chooses minimal candidate route1 421, 409 because it yields the lowest weight.

While the network 400 shown in FIG. 4 comprises 8 switches, the network 400 may comprise any other topology and any number of switches or routers connected to each other.

Figure 5:
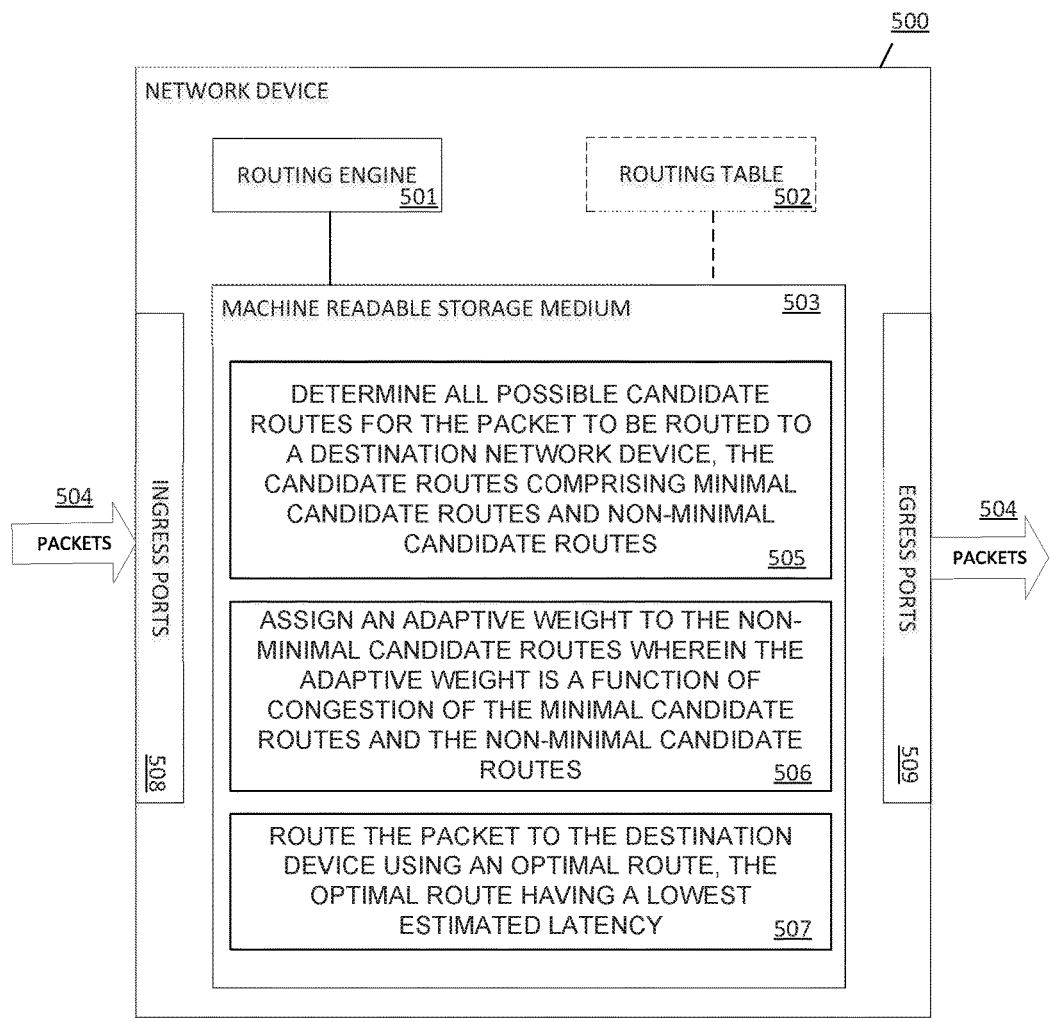
FIG. 5 is a block diagram of an example network device for routing packets based on congestion in the minimal and the non-minimal candidate routes and including a machine-readable storage medium that stores instructions to be executed by a routing engine of the network device.

FIG. 5 is a block diagram of an example network device 500 for routing packets 504 based on congestion in the minimal and the non-minimal candidate routes and including a machine-readable storage medium 503 that stores instructions to be executed by a routing engine 501 of the network device 500. It should be understood that the network device 500 depicted in FIG. 5 may include additional components and that some of the components described herein may be removed and/or modified without departing from a scope of the example network device 500. Additionally, implementation of network device 500 is not limited to such example. It should also be understood that routing engine 501 may represent a combination of hardware and software logic in network device 500 for determining candidate routes for a packet to take from a source device to a destination device.

The network device 500 is depicted as including a plurality of ingress ports 508 through which packets 504 of data are received, a plurality of egress ports 509 through which packets 504 are forwarded towards their destination network devices, a machine readable storage medium 503, a routing engine 501 and a routing table 502. The routing engine 501 may include hardware and software logic to execute instructions, such as the instructions 505-507 stored in the machine-readable storage medium 503. While FIG. 5 shows a network device 500 comprising a routing table 502 to calculate the candidate routes for the packet 504, the network device 500 may avoid having the routing table 502 by using arithmetic operations to dynamically calculate the routes and temporarily storing this information in an internal memory (not shown in the figure). In some examples, the routing table 502 may store all the possible routes between the current network device 500 (source network device) and the rest of network devices in the network.

The routing engine 501, in response to reception of a packet 504 via any of the ingress ports 508 of the network device 500, determines at 505 all possible candidate routes for the packet 504 to be routed to the destination network device, the candidate routes comprising minimal candidate routes and non-minimal candidate routes.

In examples where the routing table 502 stores all the possible routes between the current network device 500 and the rest of network devices in the network, the routing engine 501 may decode the received packet 504 to extract an identifier of the destination network device to which the packet is to be routed. Then, the routing engine 501 may select, based on the identifier of the destination network, the candidate routes between the current network device 500 and the destination device among all the routes stored in the routing table 502.

The routing engine 501 further assigns at 506 a weight to each one of the non-minimal candidate routes, wherein the weight is a function of congestion of the minimal candidate routes and the non-minimal candidate routes. Then, the routing engine 501 further routes at 507 the packet 504 to the destination device using an optimal route. For example, the routing engine 501 may select the optimal route as the candidate route having a lowest estimated latency.

In some other examples, the routing engine 501 may also calculate the weight to be assigned to a particular non-minimal candidate route based on a combination of the function of the congestion of the minimal candidate routes and the non-minimal candidate routes and a number of hops of the particular non-minimal candidate route. The weights associated to the non-minimal candidate routes may be further stored in the routing table 502.

The routing engine 501 may include hardware and software logic to perform the functionalities described above in relation to instructions 505-507. The machine-readable storage medium 503 may be located either in the computing device executing the machine-readable instructions, or remote from but accessible to the computing device (e.g., via a computer network) for execution.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory. In examples described herein, a machine-readable storage medium or media may be part of an article (or article of manufacture). An article or article of manufacture may refer to any manufactured single component or multiple components.

Routing packets based on the actual congestion sensed in the minimal and the non-minimal candidate routes as described herein achieves many technical effects, including providing a more accurate packet delivery process that yields a significant improvement of network services, and reducing average packet delivery latency by balancing traffic based on actual congestion in the minimal and non-minimal candidate routes. In addition, the solution herein described also may be useful to avoid making trade-offs in performance between different traffic patterns, improve total throughput, reduce latency, and significantly increase systems stability.

The invention claimed is:

1. A method, comprising:
   receiving a packet at a network device of a plurality of network devices in a network wherein the packet is to be routed to a destination network device;
   determining, by a routing engine of the network device, all possible candidate routes for the packet to be routed to the destination network device, the candidate routes comprising minimal candidate routes and non-minimal candidate routes;
   assigning, by the routing engine, an adaptive weight to a non-minimal candidate route of the non-minimal candidate routes wherein the adaptive weight assigned to a particular non-minimal candidate route is determined based on a combination of a function of congestion of the minimal candidate routes and the non-minimal candidate routes and a number of hops of the particular non-minimal candidate route; and
   routing, by the routing engine, the packet to the destination device using an optimal route among the candidate routes;
   wherein the adaptive weight of the particular non-minimal candidate route is calculated by multiplying an output of the function of the congestion of the minimal candidate routes and the non-minimal candidate routes and the number of hops of the particular non-minimal candidate route.

2. The method of claim 1, comprising calculating the function of the congestion of the minimal candidate routes and the non-minimal candidate routes by adding a product of a scalar and a difference between a congestion of a fully congested minimal candidate route and a current congestion of the candidate minimal routes to the congestion of the non-minimal route.

3. The method of claim 1, comprising calculating the function of congestion of the minimal candidate routes and the non-minimal candidate routes as the difference between the congestion of the non-minimal candidate routes and the congestion of the minimal candidate routes.

4. The method of claim 1, comprising calculating the function of congestion of the minimal candidate routes and the non-minimal candidate routes as a ratio between the congestion of the non-minimal candidate routes and the congestion of the minimal candidate routes.

5. The method of claim 1, wherein the function of congestion of the minimal candidate routes and the non-minimal candidate routes is a heuristic function comprising:
   determining a congestion threshold;
   determining whether the congestion of the minimal candidate routes is less than the congestion threshold;
   returning infinity when the congestion of the minimal candidate routes is below the congestion threshold; and
   returning the congestion of the non-minimal candidate when the congestion of the minimal candidate routes is higher than or equal to the congestion threshold.

6. The method of claim 1, wherein selecting, by the routing engine, the optimal route among the candidate routes comprises selecting, by the routing engine, the optimal route as the candidate route having a lowest estimated latency.

7. The method of claim 1, wherein, when there is a plurality of minimal candidate routes, selecting, by the routing engine, the congestion of the minimal candidate routes from a group comprising:
   a minimum congestion among the congestions of the minimal candidate routes;
   a maximum congestion among the congestions of the minimal candidate routes;
   an average of the congestions of the minimal candidate routes; and
   a random congestion among the congestions of the minimal candidate routes.

8. The method of claim 1, wherein, when there is a plurality of non-minimal candidate route, selecting, by the routing engine, the congestion of the non-minimal candidate routes from a group comprising:
   a minimum congestion among the congestions of the non-minimal candidate routes;
   a maximum congestion among the congestions of the non-minimal candidate routes;
   an average of the congestions of the non-minimal candidate routes; and
   a random congestion among the congestions of the non-minimal candidate routes.

9. A non-transitory machine readable storage medium comprising instructions executable by a routing engine of a network device to:
   in response to reception of a packet in the network device, determine all possible candidate routes for the packet to be routed to a destination network device, the candidate routes comprising minimal candidate routes and non-minimal candidate routes;
   assign an adaptive weight to a non-minimal candidate route of the non-minimal candidate routes wherein the adaptive weight assigned to a particular non-minimal candidate route is determined based on a function of congestion of the minimal candidate routes and the non-minimal candidate routes and a number of hops of the particular non-minimal candidate route; and
   route the packet to the destination device using an optimal route among the candidate routes, the optimal route having a lowest estimated latency;
   wherein instructions to determine the adaptive weight to be assigned to a particular non-minimal candidate route comprise instructions to calculate the adaptive weight by multiplying the function of the congestion of the minimal candidate routes and the non-minimal candidate routes and the number of hops of the particular non-minimal candidate route.

10. The non-transitory machine readable storage medium of claim 9, wherein the instructions to assign an adaptive weight to the non-minimal candidate routes comprise instructions to determine the function of the congestion of the minimal candidate routes and the non-minimal candidate routes by adding a product of a scalar and a difference between a fully congested minimal candidate route and a current congestion of the candidate minimal routes to the congestion of the non-minimal route.

11. The non-transitory machine readable storage medium of claim 9, wherein the instructions to assign an adaptive weight to the non-minimal candidate routes comprise further instructions to determine the function of congestion of the minimal candidate routes and the non-minimal candidate routes as the difference of the congestion of the non-minimal candidate routes and the congestion of the minimal candidate routes.

12. The non-transitory machine readable storage medium of claim 9, wherein the instructions to assign an adaptive weight to the non-minimal candidate routes comprise further instructions to determine the function of congestion of the minimal candidate routes and the non-minimal candidate routes as a ratio between the congestion of the non-minimal candidate routes and the congestion of the minimal candidate routes.

13. The non-transitory machine readable storage medium of claim 9, wherein the instructions to assign an adaptive weight to a particular non-minimal candidate route comprise further instructions to:
   determine a congestion threshold;
   determine whether the congestion of the minimal candidate routes is less than the congestion threshold;
   return infinity when the congestion of the minimal candidate routes is below the congestion threshold; and
   return the congestion of the non-minimal candidate routes when the congestion of the minimal candidate routes is higher or equal than the congestion threshold.

14. A network device comprising:
   at least one ingress port through which a packet is received;
   at least one egress port through which the packet is forwarded to a destination device; and
   a routing engine to:
      determine all possible candidate routes for the packet to be routed to the destination network device, the candidate routes comprising minimal candidate routes and non-minimal candidate routes;
      assign an adaptive weight to a non-minimal candidate route of the non-minimal candidate routes, wherein the adaptive weight assigned to a particular non-minimal candidate routes is determined based on a combination of a function of congestion of the minimal candidate routes and the non-minimal candidate routes and a number of hops of the particular non-minimal candidate route; and
      route the packet to the destination device using an optimal route among the candidate routes,
      wherein the routing engine is to determine the adaptive weight to be assigned to a particular non-minimal candidate route by multiplying the function of the congestion of the minimal candidate routes and the non-minimal candidate routes and a number of hops of the particular non-minimal candidate route.

15. The network device of claim 14, wherein the routing engine is to determine the adaptive weight to be assigned to a particular non-minimal candidate route based on a combination of the function of the congestion of the minimal candidate routes and the non-minimal candidate routes and a number of hops of the particular non-minimal candidate route.

16. The network device of claim 14, wherein the routing engine is to select the optimal route among all the candidate routes as the candidate route having a lowest estimated latency.

* * * * *